(12) United States Patent
Free

(10) Patent No.: US 10,149,464 B2
(45) Date of Patent: Dec. 11, 2018

(54) TACKLE STORAGE ASSEMBLY

(71) Applicant: Scott Free, Vancouver, WA (US)

(72) Inventor: Scott Free, Vancouver, WA (US)

( * ) Notice: Subject to any disclaimer, the term of this patent is extended or adjusted under 35 U.S.C. 154(b) by 181 days.

(21) Appl. No.: 15/219,659

(22) Filed: Jul. 26, 2016

(65) Prior Publication Data

US 2018/0027787 A1 Feb. 1, 2018

(51) Int. Cl.
*A01K 87/00* (2006.01)
*A01K 97/06* (2006.01)

(52) U.S. Cl.
CPC ............ *A01K 87/007* (2013.01); *A01K 97/06* (2013.01)

(58) Field of Classification Search
CPC ....... A01K 87/007; A01K 87/08; A01K 97/06
See application file for complete search history.

(56) References Cited

U.S. PATENT DOCUMENTS

| | | | | |
|---|---|---|---|---|
| 10,795 A | * | 4/1854 | De Saxe | A45B 3/00 135/66 |
| 2,742,728 A | * | 4/1956 | Boyd | A01K 87/025 43/18.5 |
| 2,830,399 A | * | 4/1958 | Davis | A01K 97/06 43/23 |
| 2,914,881 A | * | 12/1959 | Williams | A01K 97/00 43/23 |
| 3,302,320 A | * | 2/1967 | Breeden | A01K 89/08 43/18.1 R |
| 3,711,985 A | * | 1/1973 | Winters | A01K 97/06 43/25.2 |
| 2,957,264 A | | 10/1980 | Ruff | |
| 4,467,548 A | * | 8/1984 | Tabor | A01K 97/06 43/23 |
| 4,750,287 A | | 6/1988 | Myers | |
| 4,869,011 A | | 9/1989 | Whiting et al. | |
| 5,297,676 A | * | 3/1994 | Coleman | A01K 97/06 206/315.11 |
| 5,568,698 A | | 10/1996 | Harding et al. | |
| 5,913,671 A | * | 6/1999 | Fernandez | A01K 87/08 43/18.1 R |
| 7,210,264 B1 | * | 5/2007 | Demetris | A01K 87/007 43/18.1 CT |
| 7,412,794 B2 | | 8/2008 | Smith | |
| D623,918 S | | 9/2010 | Arvinte et al. | |

FOREIGN PATENT DOCUMENTS

WO WO9504458 2/1995

\* cited by examiner

*Primary Examiner* — Richard G Davis

(57) ABSTRACT

A tackle storage assembly for storing fishing tackle within a fishing rod includes a fishing rod that has a handle and a rod. The handle is substantially hollow. A cylinder is provided and the cylinder contains fishing tackle. The cylinder is slidably positioned in the handle of the fishing rod. Thus, the cylinder is selectively stored in the handle.

11 Claims, 5 Drawing Sheets

US 10,149,464 B2

TACKLE STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to storage devices and more particularly pertains to a new storage device for storing fishing tackle within a fishing rod.

BRIEF SUMMARY OF THE INVENTION

An embodiment of the disclosure meets the needs presented above by generally comprising a fishing rod that has a handle and a rod. The handle is substantially hollow. A cylinder is provided and the cylinder contains fishing tackle. The cylinder is slidably positioned in the handle of the fishing rod. Thus, the cylinder is selectively stored in the handle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
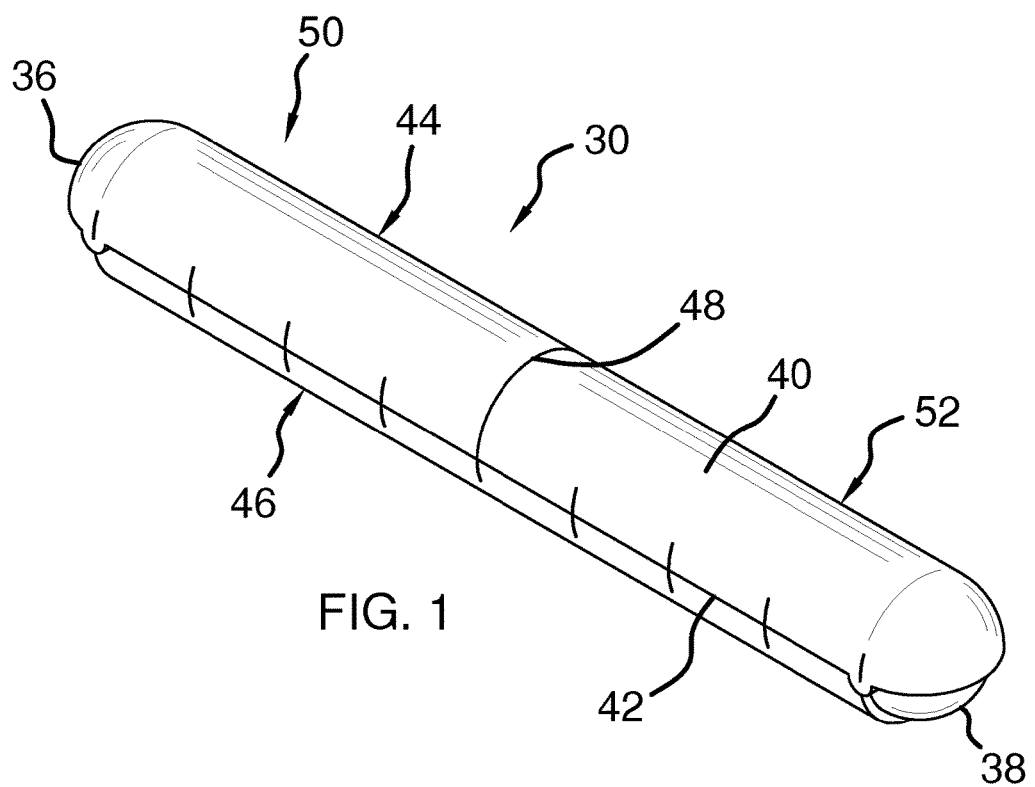
FIG. 1 is a perspective view of a cylinder of a tackle storage assembly according to an embodiment of the disclosure.
Figure 2:
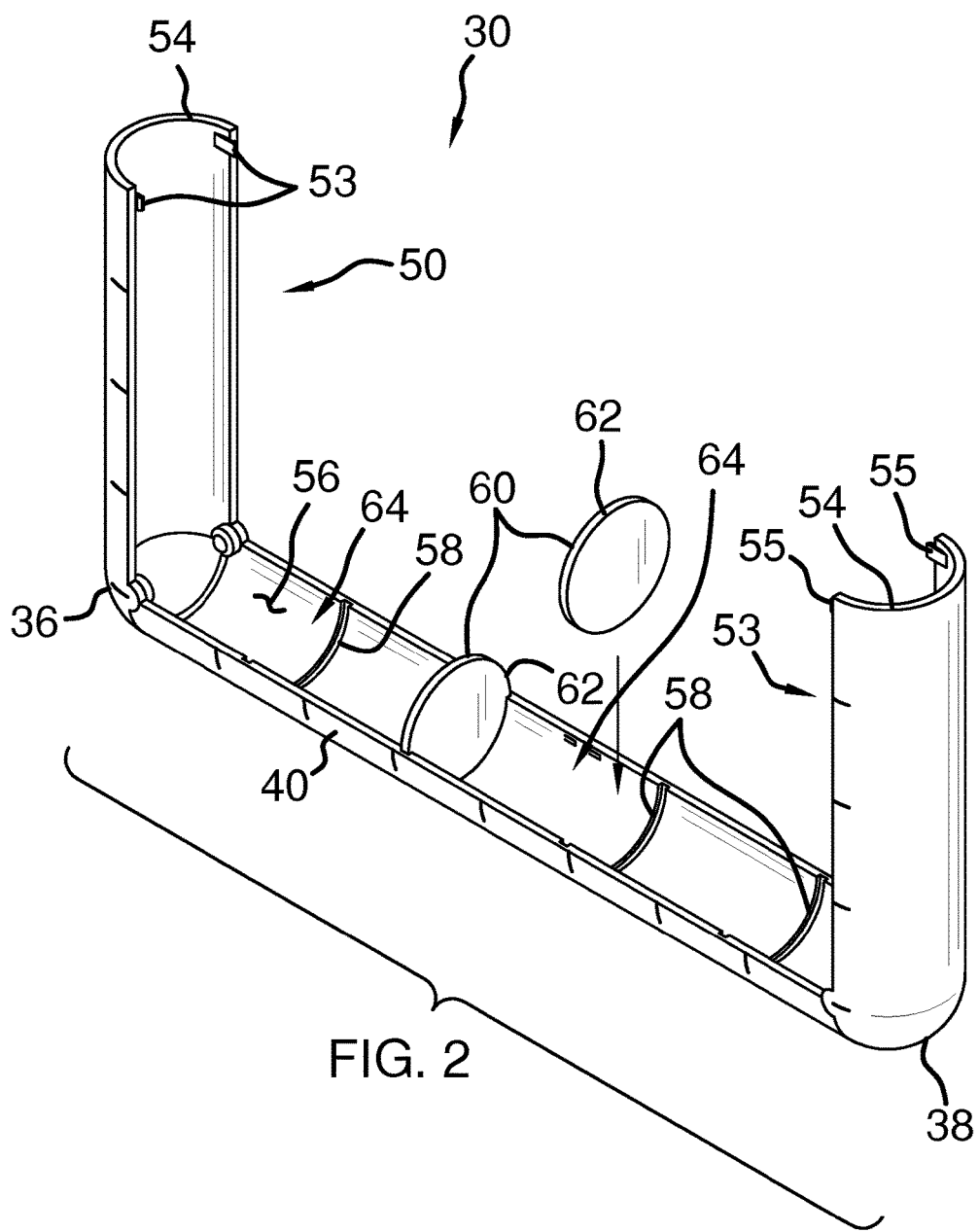
FIG. 2 is a top perspective view of a cylinder of an embodiment of the disclosure in an open position.
Figure 3:
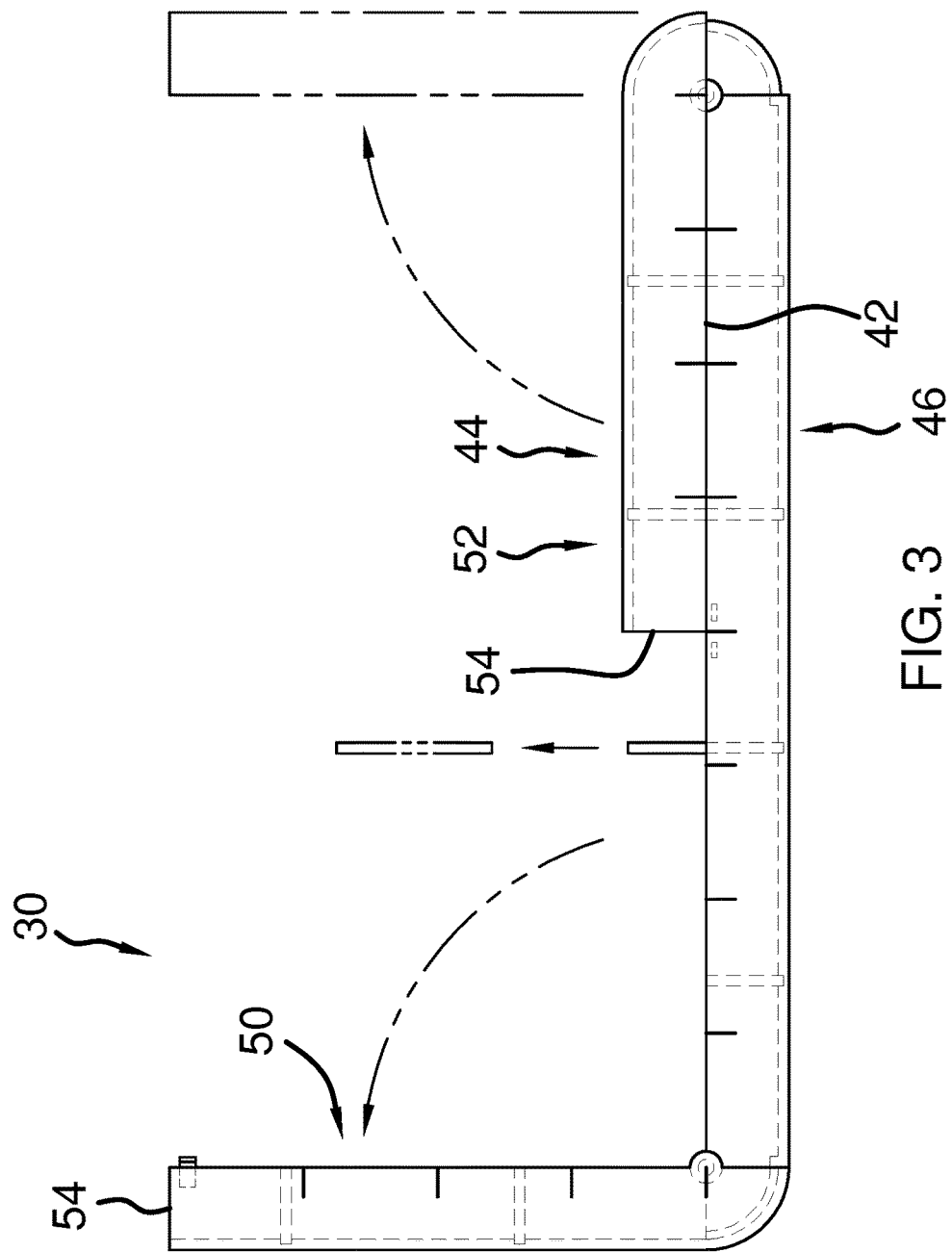
FIG. 3 is a right side phantom view of a cylinder of an embodiment of the disclosure.
Figure 4:
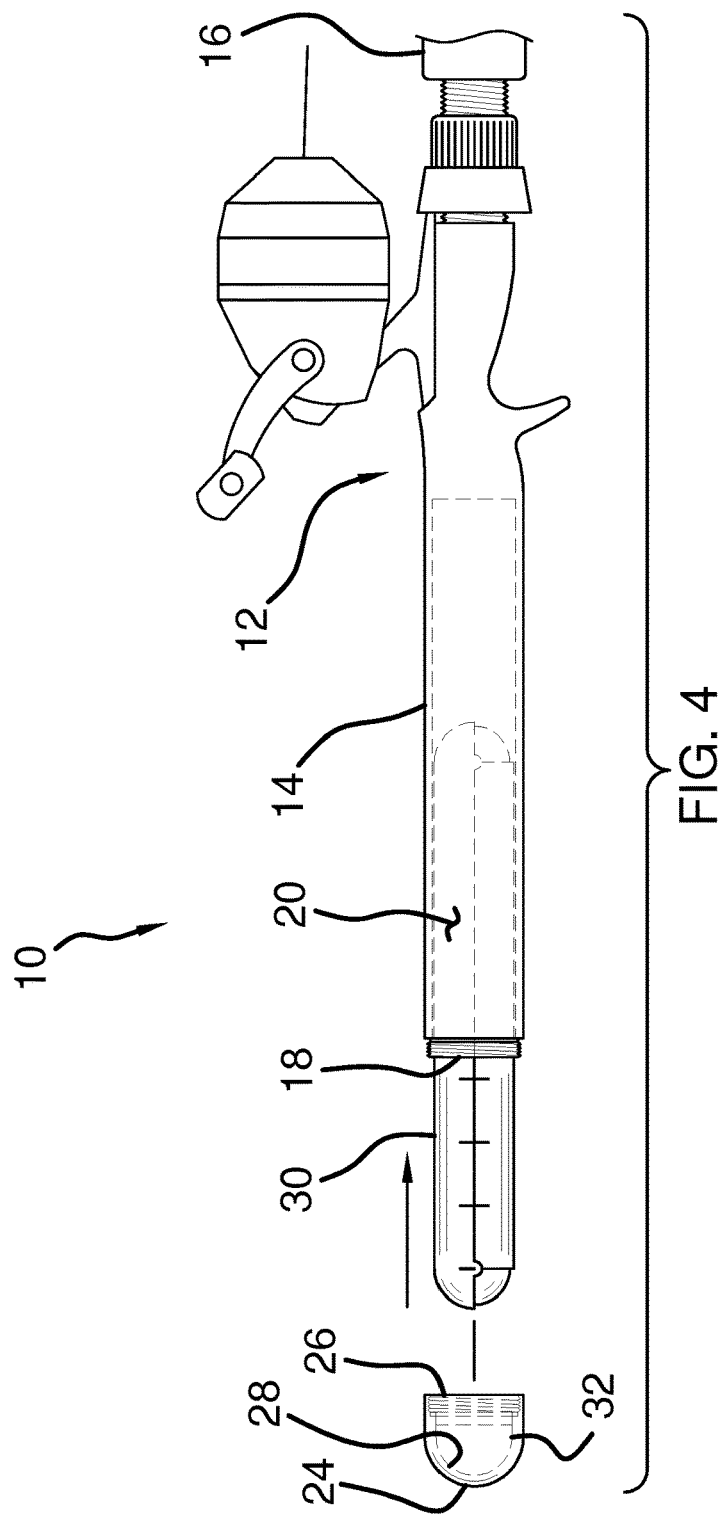
FIG. 4 is a perspective in-use view of an embodiment of the disclosure.
Figure 5:
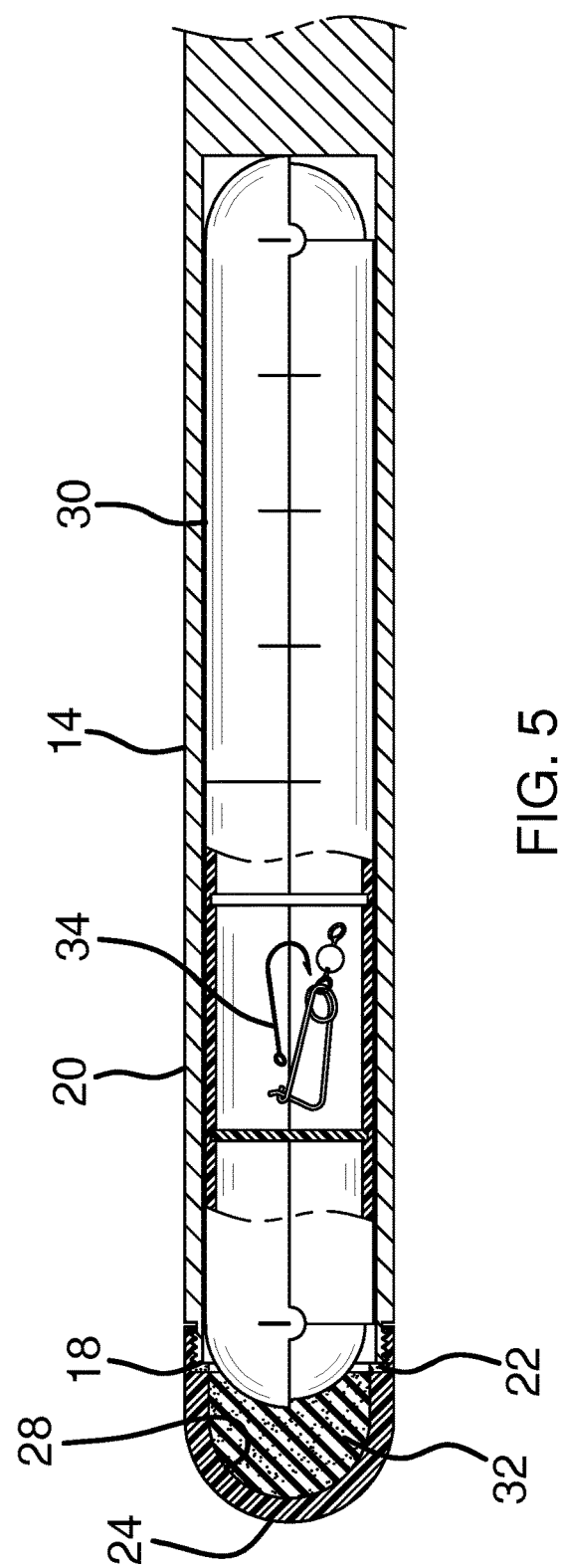
FIG. 5 is a cross sectional view taken along line 5-5 of FIG. 4 of an embodiment of the disclosure.

With reference now to the drawings, and in particular to FIGS. 1 through 5 thereof, a new storage device embodying the principles and concepts of an embodiment of the disclosure and generally designated by the reference numeral 10 will be described.

As best illustrated in FIGS. 1 through 5, the tackle storage assembly 10 generally comprises a fishing rod 12 that has a handle 14 and a rod 16. The handle 14 has a distal end 18 with respect to the rod 16. The distal end 18 is open and the handle 14 is substantially hollow. The handle 14 has an outer surface 20 and the outer surface 20 is threaded adjacent to the distal end 18.

A gasket 22 is provided. The gasket 22 is continuous such that the gasket 22 forms a closed loop. The gasket 22 is coupled to the distal end 18 of the handle 14. The gasket 22 may be comprised of a resiliently compressible material.

A bowl 24 is provided that has a lip 26 and an interior surface 28. The interior surface 28 is threaded adjacent to the lip 26. The inner surface 56 threadably engages the outer surface 20 of the handle 14. Thus, the bowl 24 closes the distal end 18 of the handle 14. The bowl 24 forms a fluid impermeable seal with the gasket 22.

A cylinder 30 is provided and the cylinder 30 may contain fishing tackle 34. The cylinder 30 is slidably positioned in the handle 14 of the fishing rod 12. Thus, the cylinder 30 is selectively stored in the handle 14. The cylinder 30 has a first end 36, a second end 38 and an outer wall 40 extending therebetween. Each of the first end 36 and the second end 38 are rounded. The cylinder 30 is substantially hollow.

A cushion 32 is provided. The cushion 32 is coupled to the interior surface 28 of the bowl 24. The cylinder 30 abuts the cushion 32 when the bowl 24 is coupled to the fishing rod 12. Thus, the cylinder 30 is inhibited from sliding within the fishing rod 12. The cushion 30 may be comprised of a resiliently compressible material.

The outer wall 40 has a longitudinal cut 42 extending around the first end 36 and the second end 38. Thus, the longitudinal cut 42 defines a top half 44 and a bottom half 46 of the cylinder 30. The longitudinal cut 42 is centrally positioned on the cylinder 30. The outer wall 40 corresponding to the top half 44 has a lateral cut 48. The lateral cut 48 defines each of a first half 50 and a second half 52 of the top half 44. The lateral cut 48 is centrally positioned on the top half 44. The lateral cut 48 defines a terminal end 54 of each of the first half 50 and the second half 52.

The outer wall 40 corresponding to the first half 50 hingedly engages the outer wall 40 corresponding to the bottom half 46. The first half 50 is selectively positioned in an open position. Thus, the terminal end 54 of the first half 50 is directed upwardly from the bottom half 46. The first half 50 is selectively positioned in a closed position. Thus, the first half 50 is coextensive with the bottom half 46.

A pair of first tabs 53 is coupled to and extends downwardly from the first half 50. Each of the first tabs 53 is positioned on opposite sides of the lateral cut 48. Each of the first tabs 53 engages the bottom half 46 when the first half 50 is in the closed position. Thus, the first half 50 is retained in the closed position.

The outer wall 40 corresponding to the second half 52 hingedly engages the outer wall 40 corresponding to the bottom half 46. The second half 52 is selectively positioned in an open position. Thus, the terminal end 54 of the second half 52 is directed upwardly from the bottom half 46. The second half 52 is selectively positioned in a closed position. Thus, the second half 52 is coextensive with the bottom half 46.

A pair of second tabs 55 is coupled to and extends downwardly from the second half 52. Each of the second tabs 55 is positioned on opposite sides of the lateral cut 48. Each of the second tabs 55 engages the bottom half 46 when the second half 52 is in the closed position. Thus, the second half 52 is retained in the closed position.

The first end 36 corresponding to the bottom half 46 is inset with respect to the first end 36 corresponding to the top half 44. Thus, the first end 36 of the top half 44 extends around the first end 36 of the bottom half 46 when the first half 50 is positioned in the open position. The second end 38 corresponding to the bottom half 46 is inset with respect to the second end 38 corresponding to the top half 44. Thus, the second end 38 of the top half 44 extends around the second end 38 of the bottom half 46 when the second half 52 is positioned in the open position.

The bottom half 46 has an inner surface 56. The inner surface 56 has a plurality of grooves 58 extending outwardly therein. Each of the grooves 58 extends between opposite sides of the longitudinal cut 42 of the bottom half 46. The grooves 58 are spaced apart from each other and are distributed between the first end 36 and the second end 38 of the bottom half 46.

A plurality of disks 60 is provided and each of the disks 60 has an outer edge 62. The outer edge 62 corresponding to each of the disks 60 is positioned in a selected one of the grooves 58. Thus, the bottom half 46 is divided into a plurality of compartments 64. The fishing tackle 34 is placed in each of the compartments 64.

In use, the fishing tackle 34 is distributed among the compartments 64. Each of the first half 50 and the second half 52 are positioned in the closed position. The cylinder 30 is inserted into the distal end 18 of the handle 14. The bowl 24 is threadably coupled to the handle 14. Thus, the fishing tackle 34 is carried with the fishing rod 12. The bowl 24 is removed from the handle 14 and selected fishing tackle 34 is removed from the cylinder 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tackle storage assembly combining a tackle box and a fishing rod, said assembly comprising:
    a fishing rod having a handle and a rod, said handle being substantially hollow; and
    a cylinder being configured to contain fishing tackle, said cylinder being slidably positioned in said handle of said fishing rod such that said cylinder is selectively stored in said handle, wherein said cylinder has a first end, a second end and an outer wall extending therebetween, each of said first end and said second end being rounded, said cylinder being substantially hollow, said outer wall having a longitudinal cut extending around said first end and said second end to define a top half and a bottom half of said cylinder, said longitudinal cut being centrally positioned on said cylinder.

2. The assembly according to claim 1, wherein said handle has a distal end with respect to said rod, said distal end being open, said handle having an outer surface, said outer surface of said handle being threaded adjacent to said distal end.

3. The assembly according to claim 2, further comprising a gasket being continuous such that said gasket forms a closed loop, said gasket being coupled to said distal end of said handle.

4. The assembly according to claim 2, further comprising a bowl having a lip and an interior surface, said interior surface being threaded adjacent to said lip, said inner surface threadably engaging said outer surface of said handle such that said bowl closes said distal end of said handle.

5. The assembly according to claim 4, further comprising a cushion being coupled to said interior surface of said bowl.

6. The assembly according to claim 1, further comprising said outer wall corresponding to said top half having a lateral cut to define each of a first half and a second half of said top half, said lateral cut being centrally positioned on said top half, said lateral cut defining a terminal end of each of said first half and said second half.

7. The assembly according to claim 6, wherein said outer wall corresponding to said first half hingedly engages said outer wall corresponding to said bottom half, said first half being selectively positioned in an open position having said terminal end of said first half being directed upwardly from said bottom half, said first half being selectively positioned in a closed position having said first half being coextensive with said bottom half, said first half frictionally engaging said bottom half when said first half is in said closed position.

8. The assembly according to claim 6, wherein said outer wall corresponding to said second half hingedly engages said outer wall corresponding to said bottom half, said second half being selectively positioned in an open position having said terminal end of said second half being directed upwardly from said bottom half, said second half being selectively positioned in a closed position having said second half being coextensive with said bottom half, said second half frictionally engaging said bottom half when said second half is in said closed position.

9. The assembly according to claim 1, wherein said bottom half has an inner surface, said inner surface having a plurality of grooves, each of said grooves extending between opposite sides of said longitudinal cut of said bottom half, said grooves being spaced apart from each other and being distributed between said first end and said second end of said bottom half.

10. The assembly according to claim 9, further comprising a plurality of disks, each of said disks having an outer edge, said outer edge corresponding to each of said disks being positioned in a selected one of said grooves such that said bottom half is divided into a plurality of compartments wherein each of said compartments is configured to contain the fishing tackle.

11. A tackle storage assembly combining a tackle box and a fishing rod, said assembly comprising:
- a fishing rod having a handle and a rod, said handle having a distal end with respect to said rod, said distal end being open, said handle being substantially hollow, said handle having an outer surface, said outer surface being threaded adjacent to said distal end;
- a gasket being continuous such that said gasket forms a closed loop, said gasket being coupled to said distal end of said handle;
- a bowl having a lip and an interior surface, said interior surface being threaded adjacent to said lip, said inner surface threadably engaging said outer surface of said handle such that said bowl closes said distal end of said handle;
- a cushion being coupled to said interior surface of said bowl; and
- a cylinder being configured to contain fishing tackle, said cylinder being slidably positioned in said handle of said fishing rod such that said cylinder is selectively stored in said handle, said cylinder having a first end, a second end and an outer wall extending therebetween, each of said first end and said second end being rounded, said cylinder being substantially hollow, said outer wall having a longitudinal cut extending around said first end and said second end to define a top half and a bottom half of said cylinder, said longitudinal cut being centrally positioned on said cylinder, said outer wall corresponding to said top half having a lateral cut to define each of a first half and a second half of said top half, said lateral cut being centrally positioned on said top half, said lateral cut defining a terminal end of each of said first half and said second half, said outer wall corresponding to said first half hingedly engaging said outer wall corresponding to said bottom half, said first half being selectively positioned in an open position having said terminal end of said first half being directed upwardly from said bottom half, said first half being selectively positioned in a closed position having said first half being coextensive with said bottom half, said first half frictionally engaging said bottom half when said first half is in said closed position, said outer wall corresponding to said second half hingedly engaging said outer wall corresponding to said bottom half, said second half being selectively positioned in an open position having said terminal end of said second half being directed upwardly from said bottom half, said second half being selectively positioned in a closed position having said second half being coextensive with said bottom half, said second half frictionally engaging said bottom half when said second half is in said closed position, said bottom half having an inner surface, said inner surface having a plurality of grooves, each of said grooves extending between opposite sides of said longitudinal cut of said bottom half, said grooves being spaced apart from each other and being distributed between said first end and said second end of said bottom half, and
- a plurality of disks, each of said disks having an outer edge, said outer edge corresponding to each of said disks being positioned in a selected one of said grooves such that said bottom half is divided into a plurality of compartments wherein each of said compartments is configured to contain the fishing tackle.

* * * * *